(12) United States Patent
Treinen

(10) Patent No.: US 8,056,115 B2
(45) Date of Patent: Nov. 8, 2011

(54) SYSTEM, METHOD AND PROGRAM PRODUCT FOR IDENTIFYING NETWORK-ATTACK PROFILES AND BLOCKING NETWORK INTRUSIONS

(75) Inventor: James J. Treinen, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 1347 days.

(21) Appl. No.: 11/608,942

(22) Filed: Dec. 11, 2006

(65) Prior Publication Data
US 2008/0141332 A1     Jun. 12, 2008

(51) Int. Cl.
*G06F 17/00* (2006.01)
(52) U.S. Cl. .................. 726/1; 726/22; 726/23; 726/25; 709/206; 709/229; 713/154
(58) Field of Classification Search .............. 726/1, 25, 726/22, 23; 713/201
See application file for complete search history.

(56) References Cited

U.S. PATENT DOCUMENTS

| | | | | |
|---|---|---|---|---|
| 2002/0107953 | A1* | 8/2002 | Ontiveros et al. | 709/224 |
| 2003/0004688 | A1* | 1/2003 | Gupta et al. | 702/188 |
| 2003/0110393 | A1* | 6/2003 | Brock et al. | 713/200 |
| 2004/0054924 | A1* | 3/2004 | Chuah et al. | 713/201 |
| 2004/0177120 | A1* | 9/2004 | Kirsch | 709/206 |
| 2005/0060643 | A1 | 3/2005 | Glass et al. | 715/501.1 |
| 2005/0289649 | A1* | 12/2005 | Mitomo et al. | 726/22 |
| 2006/0117386 | A1* | 6/2006 | Gupta et al. | 726/23 |
| 2006/0137009 | A1* | 6/2006 | Chesla | 726/22 |

OTHER PUBLICATIONS

Treinen et al., "A Framework for the Application of Association Rule Mining in Large Intrusion Detection Infrastructure," RAID 2006 Conference in Hamburg, Germany, Sep. 20-22, 2006; 19 pages.

\* cited by examiner

*Primary Examiner* — Taghi Arani
*Assistant Examiner* — Jason Lee
(74) *Attorney, Agent, or Firm* — Arthur J. Samodovitz

(57) ABSTRACT

System, method and program product for generating an attack profile. A set of messages from a same source IP address sent to a plurality of different destination IP addresses of a same company during an interval of time is identified. Each of the messages contains a respective signature characteristic of a malicious message. First and second messages of the set that are correlated to each other as part of a same attack are determined based on frequency of occurrence of the first message, frequency of occurrence of the second message in the set and similarity in a number of occurrences of the first message in the set to a number of occurrences of the second message in the set. The first message has a first signature and the second message has a second, different signature. An attack profile based on a combination of the first and second messages is generated and recorded. A rule can be automatically generated to detect a combination of the first and second messages.

14 Claims, 4 Drawing Sheets

SYSTEM, METHOD AND PROGRAM PRODUCT FOR IDENTIFYING NETWORK-ATTACK PROFILES AND BLOCKING NETWORK INTRUSIONS

FIELD OF THE INVENTION

The present invention relates generally to network security, and more specifically to identifying new network-attack profiles and blocking such network intrusions.

BACKGROUND OF THE INVENTION

Networks such as the Internet, Local Area Network, Extranets and Intranets are common today. Networks typically comprise communication media, routers, network switches, and firewalls. Computers, such as client computers and servers, are connected to each other via networks.

Network security is important, especially when the network is connected to the Internet which is not secure. There are various types of malicious "intrusions" that can jeopardize a network. Examples of malicious intrusions are viruses, worms, denial of service attacks, and buffer overflow attacks.

There are various known techniques to protect against such intrusions. A firewall at the gateway to the network or within a computer can block (a) messages containing a known electronic signature of a computer virus or worm, (b) all messages from source IP addresses known from experience to be malicious, (c) messages containing words characteristic of spam, (d) some or all messages from a source IP address which is sending an unusually large number of messages to the same destination IP address, (e) all messages sent from a source IP address to a destination IP address which should not receive messages from this source IP address, (f) entire networks which are known to be malicious and (g) entire countries for which there is no legitimate reason to allow network traffic.

An electronic "signature" of a computer virus, worm or other malicious network activity is a series of bits known from experience to be present in the virus, worm or other malicious network activity. An intrusion detection sensor in a firewall, gateway computer or other network device scans incoming messages for the series of bits that comprise the signature of the virus, worm, or other malicious network activity. If this series of bits is found, then the intrusion detection sensor raises an alarm for inspection by security personnel, and in some cases, can block the virus, worm or other malicious network activity. One major problem with this type of intrusion detection system is the large number of false positive alarms generated by the sensors. A false positive results when an innocent message, by chance, includes the same series of bits and is mistakenly identified by the intrusion detection sensor as malicious activity. Consequently, many intrusion detection sensors are programmed to detect, but not block, messages containing malicious signatures, but simply notify a security analyst for further review to determine whether the detected flagged network traffic requires further action. After review, the security analyst can update a firewall to block subsequent attacks of this nature.

It was known to reduce the number of false positives based on meta alarms or rules which identify known patterns of alarms which have a high probability of representing true attack patterns in alarm streams, as follows. Vendors identify combinations of two or more signatures of two or more respective messages that will occur in certain types of attacks. For example, some attack messages are preceded by "reconnaissance" messages which probe for vulnerable ports, services or operating systems on the victim machine. Both the reconnaissance messages and the subsequent attack messages are characteristic signatures. Security personnel currently identify these combinations of signatures by manual inspection of alarm logs. Subsequently, if a security analyst receives intrusion sensor alerts that two or more messages with these two or more signatures have arrived from the same source IP address on the same day or within a predetermined time window, the security analyst will send an alarm that this source IP address is probably malicious. In response, there will be further investigation of this source IP address, and if the further investigation warrants, action can be taken to block subsequent messages from this source IP address. While this technique is effective, it is limited to predetermined combinations of signatures, and requires a high level of manual inspection to determine new combinations.

It was known to determine events that are associated or correlated to each other based on a "support" factor and a "confidence" factor derived from analysis of events in a set. The "support" factor is based on the frequency with which this combination of events appears in the set. The greater the frequency, the greater the "support" factor. The "confidence" factor is based on how close to a one-to-one relationship are numbers of the two events. For example if there were five groups which contain either of the two events under investigation, and four of the five groups contain both events, and the fifth event only contains one of the events, the number of groups in which the combination of the two events occurs, then the confidence level is ⅘ or eighty percent that these two events are correlated to each other because in four of five groups both events occurred. The closer the numbers match to one-to-one, the greater the "confidence" factor. If the confidence and support factors together are high enough, then events are considered correlated to each other as a combination.

It was also known to provide a table which lists for each destination IP address the source IP addresses of messages containing malicious signatures that were sent to this destination IP address. U.S. Patent Application "System, Method and Program Product for Visually Presenting Data Describing Network Intrusions", Ser. No. 11/486,742" filed by James Treinen on Jul. 13, 2006 discloses a system which generates a graphical representation (comprising vertices representing IP addresses and edges representing malicious message flows including their direction) of destination IP addresses of a customer site, and the source IP addresses that sent each destination IP address messages which contain malicious signatures. From this graphical representation, a security analyst can identify source IP addresses that are sending to the customer site a large number of messages containing malicious signatures. When this occurs, it is likely that the source IP address is malicious.

A Knowledge Discovery in Database ("KDD") process is also known. The KDD process comprises the following steps: (1) understanding the application domain, i.e. analyzing the possible data that can be generated by the application, and understanding the information that is contained in this data, (2) integrating and selecting data, i.e. selecting an appropriate set of data for analysis as a means of obtaining the appropriate end information, (3) mining data, i.e. the actual application of the automated data analysis, (4) evaluating patterns, i.e. inspecting resulting information by skilled analysts and (5) presenting knowledge, i.e. displaying the results in a consumable format for the end users. See "Data Mining for Intrusion Detection A Critical Review, by K. Julisch published in Applications of Data Mining in Computer Security in 2002.

While these techniques are effective in identifying malicious messages and reducing the number of false positives, further improvement can be made to further reduce false positives based on presence of malicious signatures.

An object of the present invention is to identify malicious messages based in part on presence of malicious signatures while reducing false positives.

Another object of the present invention is to automatically take corrective action against malicious messages.

SUMMARY OF THE INVENTION

The present invention resides in a system, method and program product for generating an attack profile. A set of messages from a same source IP address sent to a plurality of different destination IP addresses of a same company during an interval of time is identified. Each of the messages contains a respective signature characteristic of a malicious message. First and second messages of the set that are correlated to each other as part of a same attack are determined based on frequency of occurrence of the first message, frequency of occurrence of the second message in the set and similarity in a number of occurrences of the first message in the set to a number of occurrences of the second message in the set. The first message has a first signature and the second message has a second, different signature. An attack profile based on a combination of the first and second messages is generated and recorded.

According to a feature of the present invention, a rule is automatically generated to detect a combination of the first and second messages.

According to optional features of the present invention, the rule is installed in a firewall, and the rule blocks a combination of the first and second messages.

The present invention also resides in a system, method and program for generating an attack profile. A set of messages from a same source IP address sent to a plurality of destination IP addresses during an interval of time is identified. Each of the messages contains a respective signature characteristic of a malicious message. An identification of a signature of interest is determined. In response, a determination is made that the signature of interest was contained in messages that were sent only to a subset of the destination IP addresses and there were other messages containing other signatures that were sent to one or more other of the destination IP addresses. One of these other destination IP addresses did not send to or receive from the subset of destination IP addresses any messages containing malicious signatures. In response, the one other message from the set is discarded. After the discarding of the one other message, a determination is made that the first and second messages remaining in the set are correlated to each other as part of a same attack based on frequency of occurrence of the first message, frequency of occurrence of the second message in the set and similarity in a number of occurrences of the first message in the set to a number of occurrences of the second message in the set. The first message has a first signature and the second message has a second, different signature. An attack profile is generated and recorded based on a combination of the first and second messages.

DETAILED DESCRIPTION OF THE PREFERRED EMBODIMENTS

Figure 1:
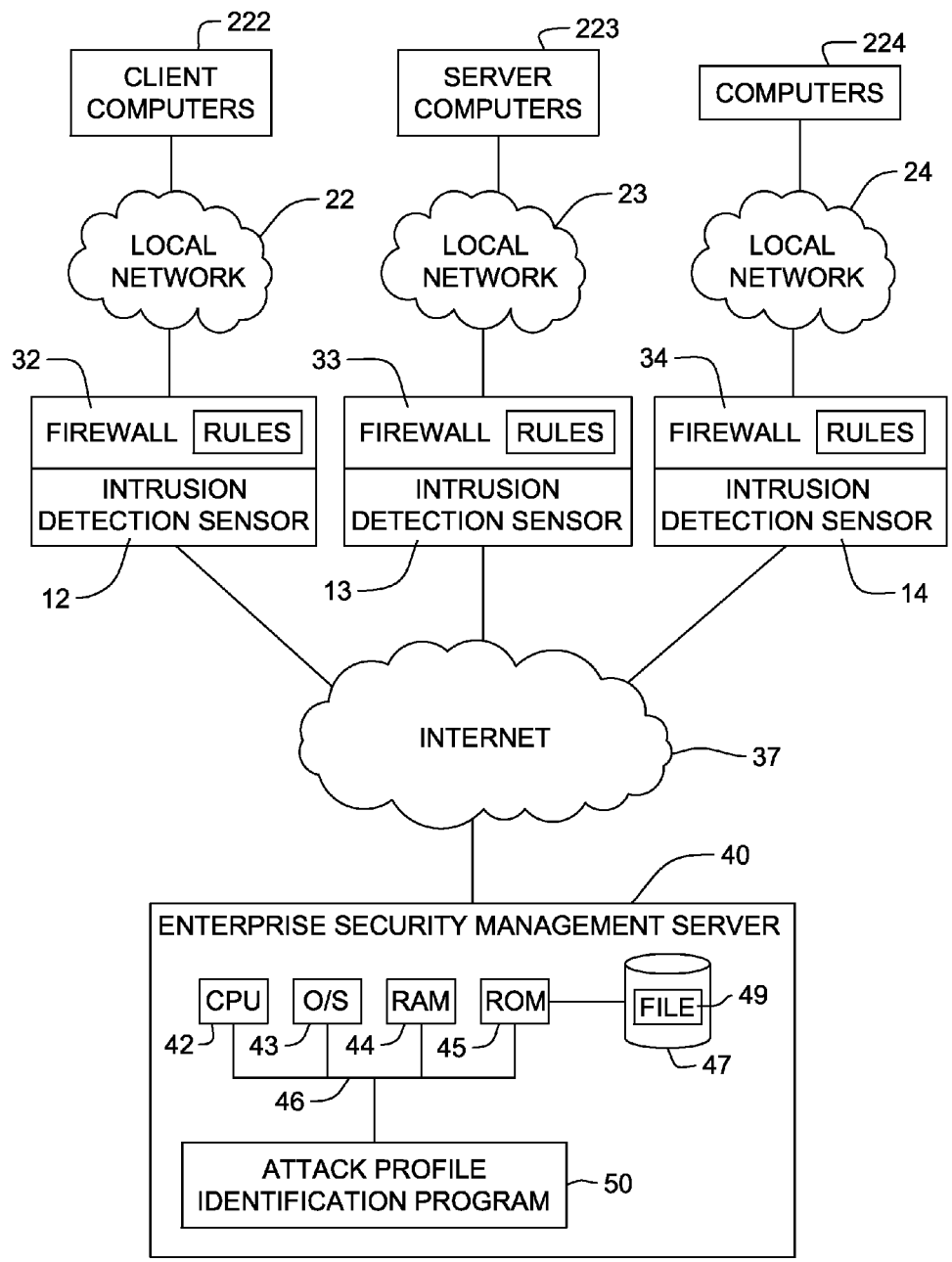
FIG. 1 is a block diagram of a distributed computer system which includes known sensors to detect intrusions based on signatures known to be malicious, and a server with an attack profile identification program according to the present invention to determine new attack profiles based in part on the messages containing malicious signatures.

The present invention will now be described in detail with reference to the figures. FIG. 1 illustrates a distributed computer system generally designated 10. Distributed computer system 10 comprises known intrusion detection sensors 12, 13 and 14 on local networks 22, 23 and 24, respectively, for client computers 222, server computers 223 and other computers 224, respectively, for a same company. By way of example, intrusion detection sensors 12, 13 and 14 reside at gateways to local networks 22, 23 and 24, respectively. The intrusion detection sensors can reside in gateway servers or firewalls for respective gateway servers. Intrusion detection sensors include known hardware and/or software to scan incoming messages for signatures of known viruses, worms or other malicious network traffic. A "signature" is a series of bits found in a known virus, worm or other malicious network traffic that is characteristic of the virus or worm. Thus, if a message arrives at the gateway, and the message contains this signature, the respective intrusion detection sensor will detect this series of bits. In response, the intrusion detection sensor will flag the message and notify an enterprise security management server 40 that the message is a potential virus or worm or other attack. However, an innocent or friendly message may, by statistical chance, contain the same series of bits, and trigger the intrusion detection sensor in the same manner as would a virus or worm. This situation is called a "false positive".

Server 40 comprises a known CPU 42, operating system 43, RAM 44 and ROM 45 on a common bus 46. Server 40 also includes an (internal or external) storage 47 to record in a file 49 descriptions of the messages found by the intrusion detection sensors 12, 13 and 14 to contain a malicious signature. The descriptions specify the source IP address, destination IP address, source IP port, destination IP port, signature description, captured network traffic that include the signature, date and time of day of receipt of the message, and the identity of the malicious signature that was matched, as well as other pertinent data depending on the model and make (i.e. vendor) of the employed intrusion detection sensor. Server 40 also includes an attack profile identification program 50 according to the present invention to identify new attack profiles based in part on the output of the intrusion detection sensors. Attack profile identification program 50 is stored on computer readable disk storage device 47 for execution by CPU 42 via computer readable RAM 44. Program 50 operates as follows. Periodically, such as daily, program 50 reads the descriptions of messages stored in file 49 and groups the messages into sets based on a common source IP address. Thus, all messages (containing any of a multiplicity of malicious signature) in each set originated from the same source IP address during that day and were sent to any destination IP address of the same company. For the set of messages from each source IP address, program 50 determines if messages in the set contain different malicious signatures, and if so, which messages containing different malicious signatures are associated or correlated to each other. For example, one message (with a first malicious signature) could have been a reconnaissance message to look for open ports, and another message (with a second, different malicious signature) could have been the actual attack directed to the open port found by the reconnaissance message. In this example, these two messages are associated with or correlated to each other. Next, program 50 determines which messages (with different signatures) are associated or correlated to each other based on a "support" factor and a "confidence" factor derived from analysis of the messages in the set. The "support" factor is based on the frequency with which this combination of messages appears in the set, i.e. was sent from the same source IP address during the day to any of the destination IP addresses of the company. The greater the frequency, the greater the "support" factor. The "confidence" factor is based on how close to a one-to-one relationship are numbers of the two messages occurring in the same group, for example when grouped by source IP address. For example if, by the end of the day, there were five messages groups which contain either of the two events under investigation, and four of the five groups contain both events, and the fifth event only contains one of the events, the number of groups in which the combination of the two events occurs, then the confidence level is 4/5 or eighty percent that these two messages are correlated to each other because in four of five groups both events occurred. The closer the numbers match to one to one, the greater the "confidence" factor. If the confidence and support factors together are high enough, then program 50 concludes that messages in this combination are correlated to each other and malicious, and the source IP address is malicious as well. For example, if Support Factor>5% or Confidence Factor>80%, this is indicative of a likely malicious combination.

If the "support" factor and "confidence" factor are sufficiently high, then program 50 generates a new combination-attack profile to identify subsequent malicious attacks, and notifies a security analyst. The new combination-attack profile would be receipt of a message with the one malicious signature in the combination and also receipt of a message with the other malicious signature in the same combination both from the same source IP address. Typically, the security analyst will further review the new attack profile based on content, function and effect of the messages and the owner of the source IP address(es) of the malicious signatures. If the security analyst determines that the messages are likely malicious based on this review, then the security analyst can manually create a rule for installation in the enterprise security manager 40 so that future instances of this pattern are detected automatically by the newly installed rule. Thus, once the rule discovered by program 50 is installed in the enterprise security management server 40, the enterprise security management server 40 will flag and highlight future instances of these messages as likely malicious messages and notify a security analyst. Because there are now two indicia of maliciousness, i.e. the two (or more) messages matching predetermined malicious signatures and the combination of these messages matching the new combination-attack profile rule, the chance of a false positive is reduced.

A security analyst takes corrective, typically after confirming that the combination represents an attack. For example, the security analyst can manually create and add a new rule to the respective firewall 32, 33 or 34 to block all messages from the source IP address(es) that sent the combination of messages. Alternately, after program 50 identifies the new combination-attack profile, program 50 automatically generates a corresponding rule to block this combination of messages from passing through a firewall, and automatically installs this new rule into each firewall 32, 33 and 34. According to the rule, if a firewall detects any message within the combination, it holds it for a predetermined times, such as 30 minutes. If the other message(s) within the combination arrive at the same firewall within the predetermined time, the firewall blocks (i.e. discards) the combination of messages so they will not pass through to their intended destination. Optionally, if a firewall detects any message within the combination, it holds it for a predetermined times, such as 30 minutes, and also notifies the other firewalls within the same enterprise of the message, and these other firewalls retain the notification for the predetermined time. If the other message(s) within the combination arrive at any of the firewalls within the enterprise within the predetermined time, the firewalls block (i.e. discard) the messages of the combination which they received so they will not pass through to their intended destination.

Figure 2:
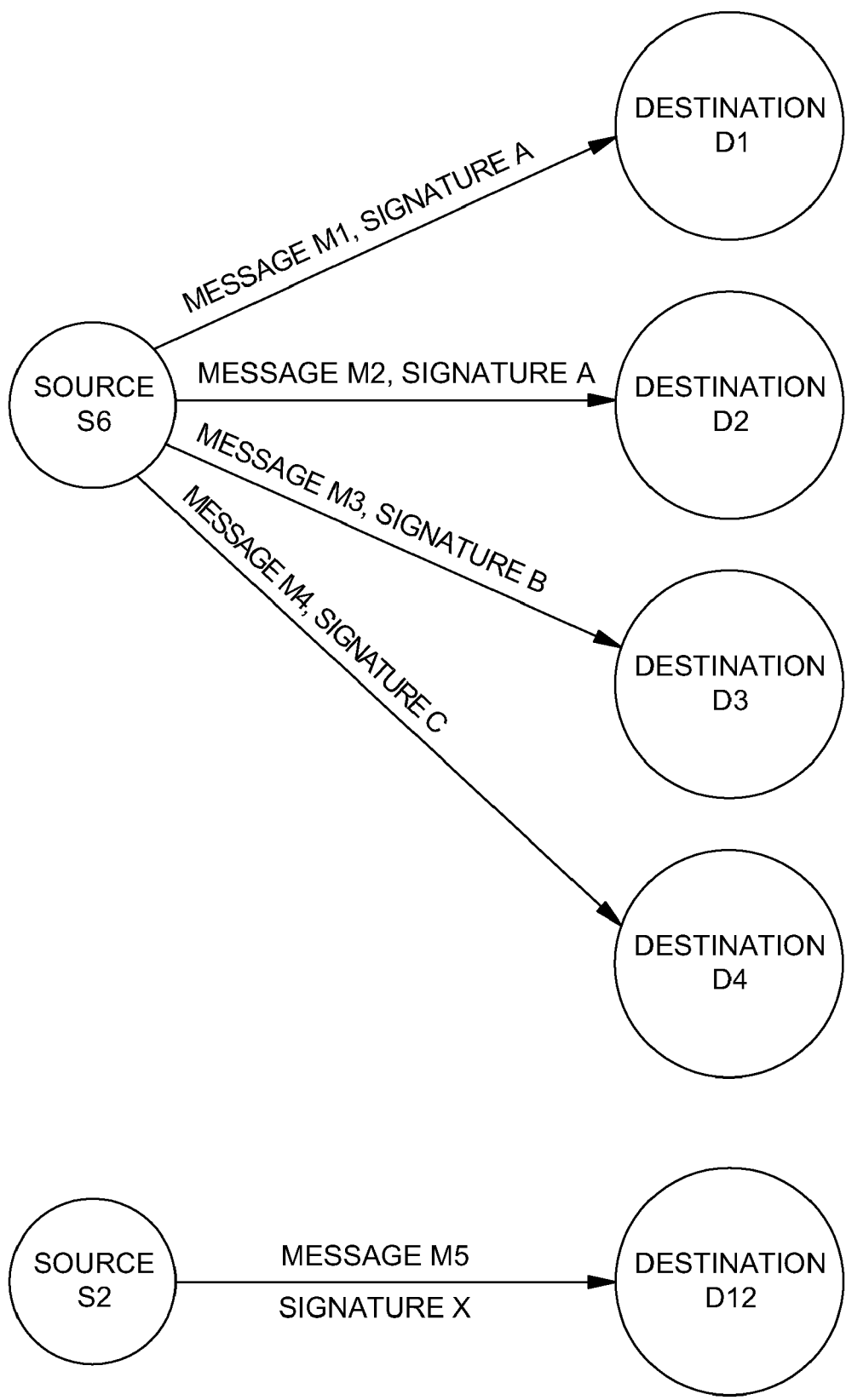
FIG. 2 illustrates an example of a feature of the attack profile identification program of FIG. 1, where certain messages are discarded from a set of messages, to facilitate determination of a combination of correlated messages containing different signatures.

The foregoing processing by program 50 to determine a combination of messages with different signatures in each set is hampered and rendered less precise by the presence of other messages in the set which are not part of the combination. Accordingly, a security analyst can direct program 50 to filter out such other messages from each set, based on the security analyst's selection of a signature of interest, as follows. Program 50 uses the information contained in each event, specifically the source ip address of the alarm and the destination IP address of the alarm, to determine the direction of the detected activity. By drawing a directed graph with each IP address as a vertex of the graph and a directed edge from the source IP address to the destination IP address, program 50 produces a full directed graph of all of the alarms present in File 49. FIG. 2 provides an example of this. For any two vertices (IP addresses) in the graph, the two respective IP addresses are deemed to be in the same connected component regardless of the direction of the edge between them. For example, S6 and D3 are considered to be in the same connected component in FIG. 2, while D3 and D12 are not in the same connected component. To limit the total number of messages that must be examined, the user can provide a subject signature, for example Signature C in FIG. 2. Program 50 then discards all connected components of the graph which do not have this signature present in them. For example, FIG. 2 is comprised of two distinct connected components, and Signature C is present in only one of the connected components in the message between S6 and D3. It is not present in any messages in the second connected component, which is comprised only of source S2 and destination D12, with message M5 and Signature X. As such, program 50 discards the messages which comprise the second connected component, in this case message M5. The reason to discard such other messages is that they are not likely to be related to the combination of messages with the designated signatures because there is no structural relevance between them and the other messages in the directed graph. By reducing the total number of messages which must be examined (by removing messages which are not related to the combination of messages with the designated signatures) program 50 will be more accurate in avoiding false positives.

FIG. 2 illustrates an example where certain messages are discarded from a set of messages, to facilitate determination of a combination of correlated messages containing different signatures. In the example of FIG. 2, a Source IP address S6 sends messages M1-M4 (triggering signature alarms) to destination IP addresses D1-D4 respectively, of a same company, where the messages are indicated by respective arrows. Messages M1-M2 contain signature A, Message M3 contains signature B and Message M4 contains signature C. Also, Source IP address S2 sent a message M5 (triggering a signature alarm) to destination IP address D12 where the message M5 is also indicated by an arrow. Without filtering by program 50, program 50 will include all of messages M1-M5 in its automated analysis, and message M5 could effect conclusions by program 50 as to correlations with messages M1-M4, even though they are not likely related. The reason they are not related is that there is no path between the vertices/nodes S6, D1, D2, D3, and D4 to S2 or D12 in the directed graph, as such no relationship can exist in the set of alarms. Because of this, program 50 does not include M5 in the analysis of the messages M1-M4. However, with filtering by program 50, and security analyst selection of signature A, message M5 with signature X will be discarded from the set because there does not exist in the directed graph representing the attacks a path between the vertices involved in messages M1-M4 and the separate connected component comprised of source S2, destination D12, and Message M5. So, with the filtering, only Messages M1, M2, M3 and M4 are considered in the correlation processing, and this exclusion of messages (such as M5) which cannot possibly be related to this set M1-M4 will improve the accuracy of the processing (and also reduce the processing time) by program 50.

Figure 3A:
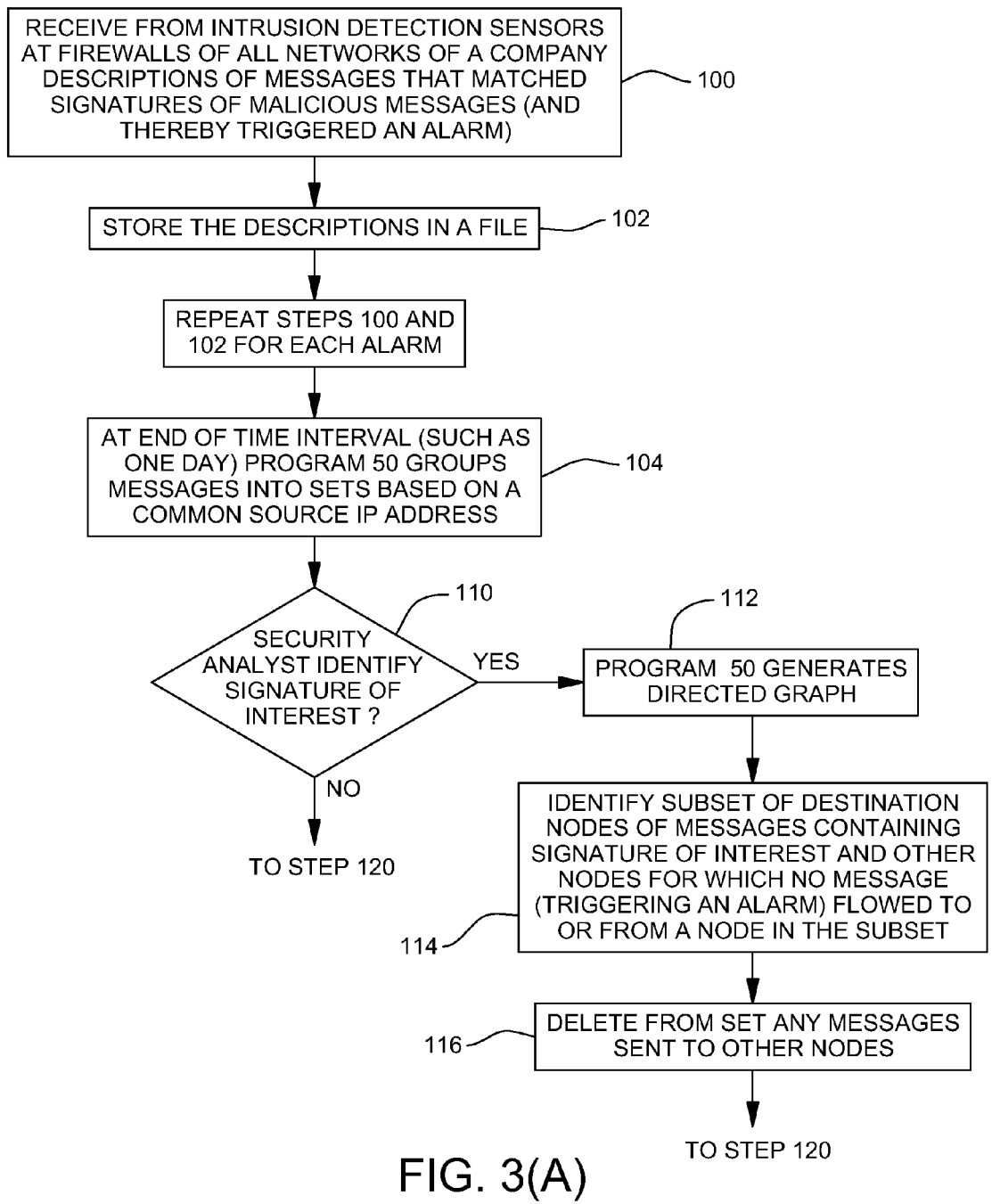
FIGS. 3(A) and 3(B) form a flow chart of the attack profile identification program of FIG. 1.
Figure 3B:
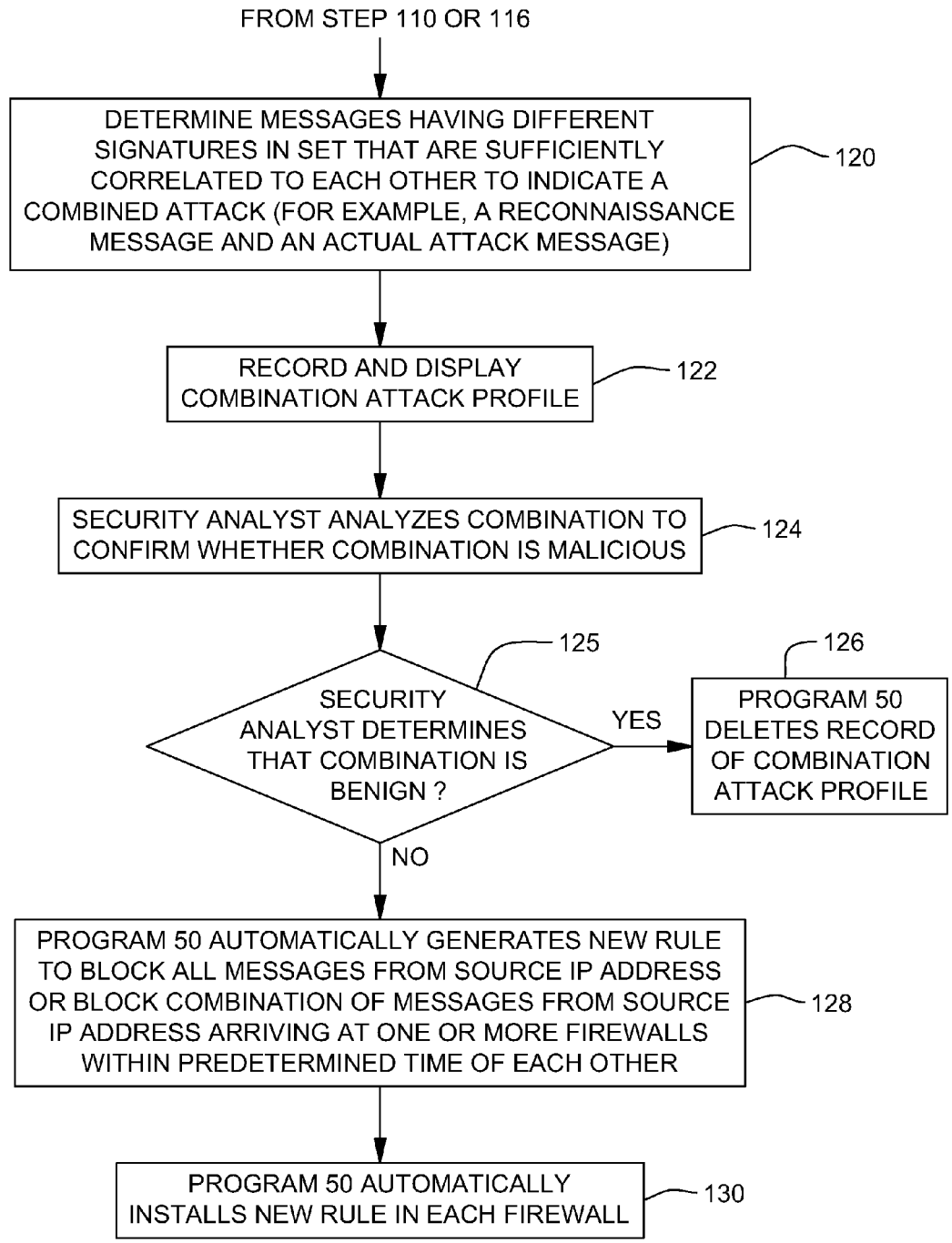

FIGS. 3(A) and 3(B) illustrate the function and operation of program 50 in more detail. In step 100, one of the intrusion detection sensors 12, 13 or 14 detects a message containing a predetermined, malicious signature. The intrusion detection sensor 12, 13 or 14 then notifies server 40, and describes the message by specifying the source IP address, destination IP address, source port, destination port, date and time of day of receipt of the message, and the identity of the malicious signature that was matched. In response, program 50 in server 40 records this description in file 49 in storage 47 (step 102). Intrusion detection sensors 12, 13 and 14 and program 50 repeat steps 100 and 102 for each message that triggers an alarm, i.e. matches a predefined malicious signature, during the course of a day (or other predetermined interval). At the end of each day, program 50 reads all the records in file 49 describing all the messages that matched any malicious signature. Next, program 50 groups the messages into sets (step 104). Each set includes all messages which matched any malicious signature, originated from the same source IP address and were sent to any destination IP address of a same company, during the day at issue.

Next, program 50 solicits input from a security analyst whether to filter each set of messages based on a specific signature of interest to the security analyst (decision 110). If so (decision 110, yes branch), then for each set of messages, program 50 generates a directed graph to illustrate the flow of messages (that triggered an alarm) in the set from the source IP address to each destination IP address of the company, and the flow of any other messages (that triggered an alarm) between any of these destination IP addresses (step 112). An example of such a direct graph is illustrated in FIG. 2. The directed graph indicates each IP address as a node that sent a message in the set, and each IP address as a node that received a message in the set, and for each message displays an arrow from the sending IP address to the destination IP address. There is a note associated with each arrow indicating the signature of the message that flowed between the two nodes, and the number of messages between this same pair of nodes which contain the same signature. Where there are messages between the same pair of nodes that contain different signatures, they are noted separately above the arrow along with the number of such messages. Program 50 will display the directed graph if so configured, or will not display the directed graph is so configured. In either case, program 50 can access the information provided by the directed graph. U.S. Patent Application "System, Method and Program Product for Visually Presenting Data Describing Network Intrusions", Ser. No. 11/486,742" filed by James Treinen on Jul. 13, 2006 provides additional detail on how to generate a directed graph, and is hereby incorporated by reference as part of the present disclosure.

Next, program 50 identifies from the directed graph which destination nodes are not connected to any destination node that received a message containing the signature of interest (step 114). In the example illustrated in FIG. 2, if the signature of interest is Signature A, and messages M1 and M2 containing Signature A were sent to destination IP addresses D1 and D2, and destination IP address D3 received a Message M3 with Signature B, and destination IP address D4 received a Message M4 with Signature C, then Source S6, Destinations D1, D2, D3, D4 are said to comprise connected component "C1". Source S2 sends message M5 with signature X to destination D12 and is said to comprise connected component "C2". "C1" and "C2" are distinct from one another because no edge in the directed graph connects any vertex between "C1" and "C2". As no edge in the graph connects "C1" and "C2", and as the Signature A is the signature for which analysis was requested by the analyst, program 50 will discard all messages which are in connected components for which Signature A is not present, (in this case, all of the messages in "C2"). Thus, program 50 filters out Message M5 from the set (step 116). Therefore, Messages M1, M2, M3 and M4 remain in the set, and are considered in the processing to determine correlations.

After the filtering of step 116 or if the security analyst did not select a signature of interest (decision 110, no branch), then program 50 proceeds to step 120 to determine for each set of messages one or more new combination-attack profiles, if any, based on the messages in the set. As explained above, program 50 looks for associations or correlation between the messages in the set based on support and confidence factors. For example, if there are a significant number of messages containing one type of signature in a set and a similar, significant number of messages containing another type of signature in the same set, then the two types of messages are likely correlated and constitute a combination-attack profile. After performing step 120 for each set of messages, program 50 records and displays the resultant combination-attack profiles and also notifies a systems administrator (step 122).

For any combination of messages identified in step 120 the security analyst performs additional analysis of the combination-attack profile to determine with greater certainty whether the combination is in fact malicious (step 124). For example, the security analyst can examine the content, function and effect of the messages and the ports targeted by the messages to determine if the messages were capable of a malicious attack, as well as identify the owner of the source IP address to determine if the owner has a legitimate need to access the destination site. If the security analysts determine that the messages were benign (decision 125, yes branch), then the security analyst notifies program 50 to delete the new combination-attack profile (step 126). However, if the security analyst determines that the messages were likely malicious (decision 125, no branch), then the security analyst can invoke program 50 to automatically generate a new rule to either block all subsequent messages from source IP addresses of messages in the combination or block the combination of messages arriving at one or more of the firewalls 32-34. In the latter case, if a firewall detects any message within the combination, it holds it for a predetermined times, such as 30 minutes. If the other message(s) within the combination arrive at the same firewall within the predetermined time, the firewall blocks (i.e. discards) the combination of messages so they will not pass through to their intended destination. Optionally, if a firewall detects any message within the combination, it holds it for a predetermined times, such as 30 minutes, and also notifies the other firewalls within the same enterprise of the message, and these other firewalls retain the notification for the predetermined time. If the other message(s) within the combination arrive at any of the firewalls within the enterprise within the predetermined time, the firewalls block (i.e. discard) the messages of the combination which they received so they will not pass through to their intended destination. In step 130, program 50 installs the new rule in firewalls 324.

Program 50 can be loaded into server 40 from a computer readable media 57 such as magnetic tape or disk, optical disk, DVD, semiconductor memory, memory stick, etc. or downloaded from the Internet 37 via TCP/IP adapter card 58.

Based on the foregoing, a system, method and program product for identifying new attack profiles and taking corrective action have been disclosed. However, numerous modifications and substitutions can be made without deviating from the scope of the present invention. For example, program 50 can group the alarms by destination IP address, port or any other data attribute present in the data row. Therefore, the present invention has been disclosed by way of illustration and not limitation, and reference should be made to the following claims to determine the scope of the present invention.

What is claimed:

1. A method for identifying a combination of messages suspected of being malicious, the method comprising the steps of:
  a computer obtaining an identification of first and second messages sent from a same source IP address to a multiplicity of different destination IP addresses, the first message individually having a first signature characteristic of a first malicious message, and the second message individually having a second, different signature characteristic of a second, different malicious message;
  the computer determining a frequency with which the source IP address sent both the first and the second messages to any of the multiplicity of destination IP addresses;
  the computer determining a ratio of a number of the destination IP addresses that received both the first and the second messages to a number of the destination IP addresses that received at least one of the first and the second messages; and
  responsive to the frequency and ratio being indicatively high factors to suspect that the combination of the first and the second messages forms a malicious combination of messages, the computer making an electronic record that the combination of the first and the second messages is suspected to form a malicious combination of messages.

2. The method of claim 1 further comprising the step of the computer generating a rule for installation in a firewall to detect the combination of the first and the second messages.

3. The method of claim 2 further comprising the step of installing the rule a firewall.

4. The method of claim 1 further comprising the step of the computer generating a rule for installation in a firewall to block the combination of the first and the second messages.

5. The method of claim 4 further comprising the step of installing the rule a firewall.

6. The method of claim 1 wherein the first and the second messages were sent from the source IP address to the multiplicity of different destination IP addresses during a predetermined interval, and the frequency determining step and ratio determining step were performed for the first and the second messages sent from the source IP address to the multiplicity of different destination IP addresses during the predetermined interval.

7. A computer program product comprising at least one computer readable tangible storage device and computer readable program instructions stored and contained in the at least one computer readable tangible storage device for identifying a combination of messages suspected of being malicious, the computer readable program instructions, when executed instructing a CPU to:
  obtain an identification of first and second messages sent from a same source IP address to a multiplicity of different destination IP addresses, the first message individually having a first signature characteristic of a first malicious message, and the second message individually having a second, different signature characteristic of a second, different malicious message;
  determine a frequency with which the source IP address sent both the first and the second messages to any of the multiplicity of destination IP addresses;
  determine a ratio of a number of the destination IP addresses that received both the first and the second messages to a number of the destination IP addresses that received at least one of the first and the second messages; and
  responsive to the frequency and ratio being indicatively high factors to suspect that the combination of the first and the second messages forms a malicious combination of messages, make an electronic record that the combination of the first and the second messages is suspected to form a malicious combination of messages.

8. The computer program product of claim 7 wherein the computer readable program instructions, when executed further instructing the CPU to generate a rule for installation in a firewall to detect the combination of the first and the second messages.

9. The computer program product of 7 wherein the computer readable program instructions, when executed further instructing the CPU to generate a rule for installation in a firewall to block the combination of the first and the second messages.

10. The computer program product of claim 7 wherein the first and the second messages were sent from the source IP address to the multiplicity of different destination IP addresses during a predetermined interval, and the computer readable program instructions determine the frequency and the ratio for the first and the second messages sent from the source IP address to the multiplicity of different destination IP addresses during the predetermined interval.

11. A computer system for identifying a combination of messages suspected of being malicious, the computer system comprising:
  a CPU, a computer readable memory and a computer readable tangible storage device(s);
  first program instructions to obtain an identification of first and second messages sent from a same source IP address to a multiplicity of different destination IP addresses, the first message individually having a first signature characteristic of a first malicious message, and the second message individually having a second, different signature characteristic of a second, different malicious message;
  second program instructions to determine a frequency with which the source IP address sent both the first and the second messages to any of the multiplicity of destination IP addresses;

third program instructions to determine a ratio of a number of the destination IP addresses that received both the first and the second messages to a number of the destination IP addresses that received at least one of the first and the second messages; and fourth program instructions, responsive to the frequency and ratio being indicatively high factors to suspect that the combination of the first and the second messages forms a malicious combination of messages, to make an electronic record that the combination of the first and the second messages is suspected to form a malicious combination of messages; and wherein the first, second, third and fourth program instructions are stored and contained in the computer readable tangible storage device(s) for execution by the CPU via the computer readable memory.

12. The computer system of claim 11 further comprising fifth program instructions to generate a rule for installation in a firewall to detect the combination of the first and the second messages; and wherein the fifth program instructions are stored and contained in the computer readable tangible storage device(s) for execution by the CPU via the computer readable memory.

13. The computer system of 11 further comprising fifth program instructions to generate a rule for installation in a firewall to block the combination of the first and the second messages; and wherein the fifth program instructions are stored and contained in the computer readable tangible storage device(s) for execution by the CPU via the computer readable memory.

14. The computer system of claim 11 wherein:
the first and second messages were sent from the source IP address to the multiplicity of different destination IP addresses during a predetermined interval;
the second program instructions determine the frequency for the first and the second messages sent from the source IP address to the multiplicity of different destination IP addresses during the predetermined interval; and
the third program instructions determine the ratio for the first and the second messages sent from the source IP address to the multiplicity of different destination IP addresses during the predetermined interval.

* * * * *